United States Patent
Lambert et al.

(10) Patent No.: US 9,764,406 B2
(45) Date of Patent: Sep. 19, 2017

(54) ENERGY CONSERVATION AND IMPROVED COOLING IN WELDING MACHINES

(75) Inventors: Roger H. Lambert, West Lebanon, NH (US); Peng Xiao, Quincy, MA (US)

(73) Assignee: Victor Equipment Company, Chesterfield, MO (US)

( * ) Notice: Subject to any disclaimer, the term of this patent is extended or adjusted under 35 U.S.C. 154(b) by 563 days.

(21) Appl. No.: 13/480,797

(22) Filed: May 25, 2012

(65) Prior Publication Data

US 2012/0298644 A1    Nov. 29, 2012

Related U.S. Application Data

(60) Provisional application No. 61/490,329, filed on May 26, 2011.

(51) Int. Cl.

| B23K 9/06 | (2006.01) |
|---|---|
| B23K 9/067 | (2006.01) |
| B23K 9/073 | (2006.01) |
| B23K 9/095 | (2006.01) |
| B23K 9/10 | (2006.01) |

(52) U.S. Cl.
CPC .......... B23K 9/0953 (2013.01); B23K 9/0956 (2013.01); B23K 9/10 (2013.01)

(58) Field of Classification Search
CPC ... B23K 9/60; B23K 9/00; B23K 1/00; B23K 9/06; B23K 9/067; B23K 9/073; B23K 9/09; B23K 9/095; H05B 7/11
USPC ... 219/130.5, 132, 136, 137, 137.7, 129, 75, 219/108, 110, 130.1, 130.21, 130.31, 219/130.33, 137 PS, 137 R; 700/212
See application file for complete search history.

(56) References Cited

U.S. PATENT DOCUMENTS

| 3,509,314 A | 4/1970 | Freytag |
|---|---|---|
| 3,906,184 A | 9/1975 | Gibbs et al. |
| 3,950,759 A | 4/1976 | Ziegenfuss |
| 4,000,374 A | 12/1976 | De Keyser |
| 4,153,409 A | 5/1979 | Capps et al. |
| 4,300,035 A | 11/1981 | Johansson |
| 4,300,036 A | 11/1981 | Johansson |

(Continued)

FOREIGN PATENT DOCUMENTS

| CN | 1851998 A | 10/2006 |
|---|---|---|
| CN | 1866719 A | 11/2006 |

(Continued)

OTHER PUBLICATIONS

PCT Serial No. PCT/US2012/039552—Notification of Transmittal of the International Search Report and the Written Opinion of the International Searching Authority, Dated Sep. 28, 2012.

(Continued)

*Primary Examiner* — Michael Laflame, Jr.
(74) *Attorney, Agent, or Firm* — Edell, Shapiro & Finnan, LLC

(57) ABSTRACT

A system and method for generating a weld are provided. A power circuit in communication with a control circuit generates welding output voltage. A voltage reducing circuit in communication with the power circuit generates a reduced output voltage relative to the welding output voltage if the system determines that the welding process is idle for the predefined period of time. The welding output voltage is restored from the reduced voltage if the welding process is restarted.

20 Claims, 6 Drawing Sheets

(56) References Cited

U.S. PATENT DOCUMENTS

| | | | |
|---|---|---|---|
| 4,319,124 A | 3/1982 | Johansson | |
| 4,403,135 A | 9/1983 | Moyer et al. | |
| 4,447,700 A | 5/1984 | Cohen | |
| 4,450,340 A * | 5/1984 | Corrigall et al. | 219/132 |
| 4,734,556 A | 3/1988 | Namiki | |
| 4,746,051 A | 5/1988 | Peter | |
| 5,045,670 A * | 9/1991 | Gilliland | 219/130.1 |
| 5,136,139 A | 8/1992 | Gilliland | |
| 5,221,825 A | 6/1993 | Siewert et al. | |
| 5,223,683 A | 6/1993 | Ishizaka | |
| 5,233,158 A | 8/1993 | Karakama et al. | |
| 5,270,516 A | 12/1993 | Hamamoto et al. | |
| 5,938,945 A | 8/1999 | Hofmann et al. | |
| 6,087,627 A | 7/2000 | Kramer | |
| 6,207,928 B1 | 3/2001 | Kawamoto et al. | |
| 6,236,017 B1 | 5/2001 | Smartt et al. | |
| 6,335,511 B1 | 1/2002 | Rothermel | |
| 6,344,627 B1 | 2/2002 | Yonemori et al. | |
| 6,441,342 B1 | 8/2002 | Hsu | |
| 6,642,483 B1 | 11/2003 | Koga et al. | |
| 6,791,063 B2 | 9/2004 | Manthe | |
| 6,815,640 B1 | 11/2004 | Spear et al. | |
| 7,005,610 B2 | 2/2006 | Ihde et al. | |
| 7,041,937 B2 | 5/2006 | Ihde et al. | |
| 9,314,866 B2 | 4/2016 | Lambert et al. | |
| 2002/0117489 A1 | 8/2002 | Arndt et al. | |
| 2003/0222054 A1 | 12/2003 | Katou et al. | |
| 2004/0069752 A1 | 4/2004 | Ulrich et al. | |
| 2004/0079740 A1 | 4/2004 | Myers et al. | |
| 2004/0099649 A1 | 5/2004 | Decoster | |
| 2004/0173591 A1 | 9/2004 | Knoener | |
| 2004/0188405 A1 | 9/2004 | Holverson et al. | |
| 2005/0016974 A1 | 1/2005 | Myers et al. | |
| 2005/0045611 A1 | 3/2005 | Ihde et al. | |
| 2005/0199605 A1 | 9/2005 | Furman et al. | |
| 2005/0258156 A1 | 11/2005 | Rice et al. | |
| 2006/0000812 A1 | 1/2006 | Weber et al. | |
| 2006/0016792 A1 | 1/2006 | Uecker et al. | |
| 2006/0076332 A1 | 4/2006 | Matus et al. | |
| 2006/0108343 A1 | 5/2006 | Schwartz | |
| 2006/0131291 A1 | 6/2006 | Kaufman et al. | |
| 2006/0163229 A1 | 7/2006 | Hutchison et al. | |
| 2006/0196862 A1 | 9/2006 | Sickels | |
| 2006/0196865 A1 | 9/2006 | Weiss | |
| 2006/0213892 A1 | 9/2006 | Ott | |
| 2007/0164007 A1 | 7/2007 | Peters et al. | |
| 2007/0181553 A1 | 8/2007 | Stanzel et al. | |
| 2007/0251932 A1 | 11/2007 | Vogel et al. | |
| 2007/0262065 A1 | 11/2007 | Peters et al. | |
| 2008/0006612 A1 | 1/2008 | Peters et al. | |
| 2008/0011728 A1 | 1/2008 | Peters et al. | |
| 2008/0017621 A1 | 1/2008 | Uecker | |
| 2008/0078811 A1 | 4/2008 | Hillen et al. | |
| 2008/0078812 A1 | 4/2008 | Peters et al. | |
| 2008/0149610 A1 * | 6/2008 | Huismann et al. | 219/137 R |
| 2008/0156782 A1 | 7/2008 | Rice et al. | |
| 2008/0203065 A1 | 8/2008 | Feldhausen et al. | |
| 2008/0264915 A1 | 10/2008 | Manthe et al. | |
| 2009/0008374 A1 | 1/2009 | Fosbinder | |
| 2009/0032513 A1 | 2/2009 | Nishisaka et al. | |
| 2009/0112343 A1 | 4/2009 | Yuan et al. | |
| 2009/0139971 A1 * | 6/2009 | Huismann et al. | 219/137.9 |
| 2009/0152251 A1 | 6/2009 | Dantinne et al. | |
| 2009/0184098 A1 | 7/2009 | Daniel et al. | |
| 2009/0277893 A1 | 11/2009 | Speilman | |
| 2010/0018954 A1 | 1/2010 | Hussary et al. | |
| 2010/0065540 A1 | 3/2010 | Ihara et al. | |
| 2010/0108654 A1 | 5/2010 | Ulrich et al. | |
| 2010/0126976 A1 | 5/2010 | Kawamoto et al. | |
| 2010/0200553 A1 | 8/2010 | Yamazaki et al. | |
| 2010/0230394 A1 | 9/2010 | Yokota et al. | |
| 2010/0237052 A1 | 9/2010 | Daniel et al. | |
| 2010/0276406 A1 | 11/2010 | Silk et al. | |
| 2010/0288734 A1 | 11/2010 | Dave et al. | |
| 2010/0301029 A1 | 12/2010 | Meckler et al. | |
| 2010/0308026 A1 | 12/2010 | Vogel | |
| 2010/0308027 A1 * | 12/2010 | Vogel | 219/130.21 |
| 2010/0314371 A1 | 12/2010 | Davidson et al. | |
| 2011/0017718 A1 | 1/2011 | Kazmaier et al. | |
| 2011/0108536 A1 | 5/2011 | Inada et al. | |
| 2011/0155710 A1 * | 6/2011 | Farah | B23K 9/1068 219/133 |
| 2011/0204034 A1 | 8/2011 | Schartner et al. | |
| 2011/0309053 A1 | 12/2011 | Baus | |
| 2012/0298641 A1 | 11/2012 | Lambert et al. | |
| 2012/0298642 A1 | 11/2012 | Lambert et al. | |
| 2012/0298643 A1 | 11/2012 | Lambert et al. | |

FOREIGN PATENT DOCUMENTS

| | | |
|---|---|---|
| CN | 101125389 A | 2/2008 |
| CN | 101217255 A | 7/2008 |
| CN | 101686016 A | 3/2010 |
| DE | 3523879 | 1/1987 |
| EP | 2163337 | 3/2010 |
| JP | S6171178 | 4/1986 |
| JP | S63299862 A | 12/1988 |
| JP | 2001298994 | 10/2001 |
| JP | 2003071564 | 3/2003 |
| JP | 2006116561 | 5/2006 |
| JP | 2008307569 | 12/2008 |
| WO | 2011106175 | 9/2011 |

OTHER PUBLICATIONS

Search Report for PCT/US2012/039563 dated Sep. 28, 2012.
*Ex Parte Gary M. Katz,* Appeal 2010-006083, U.S. Appl. No. 09/828,122, dated Mar. 29, 2011.
Search Report for PCT/2012/039520 dated Mar. 13, 2013.
Search Report for PCT/US2012/039516 dated Sep. 28, 2012.

* cited by examiner

ENERGY CONSERVATION AND IMPROVED COOLING IN WELDING MACHINES

CROSS REFERENCE TO RELATED APPLICATIONS

This application claims the benefit of U.S. Provisional Patent Application No. 61/490,329 filed May 26, 2011, the content of which is hereby incorporated by reference in its entirety.

BACKGROUND

When a welding operation idles due to a user moving a welding gun away from a part to be welded, the idled welding gun may be a hazard to user. Existing voltage reducing devices have been used to reduce output voltage immediately after the end of the arc when the welding gun is moved away. Moreover, existing voltage reducing devices do not allow for finer control of output voltage during the idled phase.

SUMMARY

A system for generating a weld is provided. A power circuit generates welding output voltage for a welding process. A control circuit may be in communication with the power circuit. A voltage reducing circuit in communication with the power circuit generates a reduced output voltage relative to the welding output voltage if the process is idle for a period of time.

A method for generating a weld is also provided. The method includes generating, by a power circuit, a welding output voltage for a welding process. The method further includes generating, by a voltage reducing circuit, a reduced output voltage relative to the welding output voltage if the welding process is idle for a period of time.

In some implementations, the power circuit generates welding output voltage for a welding process. The control circuit may be in communication with the power circuit. Voltage and current feedback circuits may determine whether the welding process is idle for a predefined period of time and detect contact between the electrode and the part to be welded. The voltage reducing circuit in communication with the power circuit can generate a reduced output voltage relative to the welding output voltage if the feedback circuits determine that the welding process is idle for the predefined period of time. The welding output voltage is restored from the reduced voltage if the feedback circuits detect the contact or the trigger is pulled.

Further objects, features and advantages of this application will become readily apparent to persons skilled in the art after a review of the following description, with reference to the drawings and claims that are appended to and form a part of this specification.

BRIEF DESCRIPTION OF THE DRAWINGS

The drawings described herein are for illustration purposes only and are not intended to limit the scope of the present disclosure in any way.

FIG. 2b is a front view of an interface on the housing of FIG. 2a;

It should be understood that throughout the drawings, corresponding reference numerals indicate like or corresponding parts and features.

DETAILED DESCRIPTION

The term "substantially" used herein with reference to a quantity or mathematical relationship includes (1) a variation in the recited quantity or relationship of an amount that is insubstantially different from a recited quantity or relationship for an intended purpose or function, or (2) a variation in the recited quantity or relationship of an amount that produces the same quality.

Figure 1:
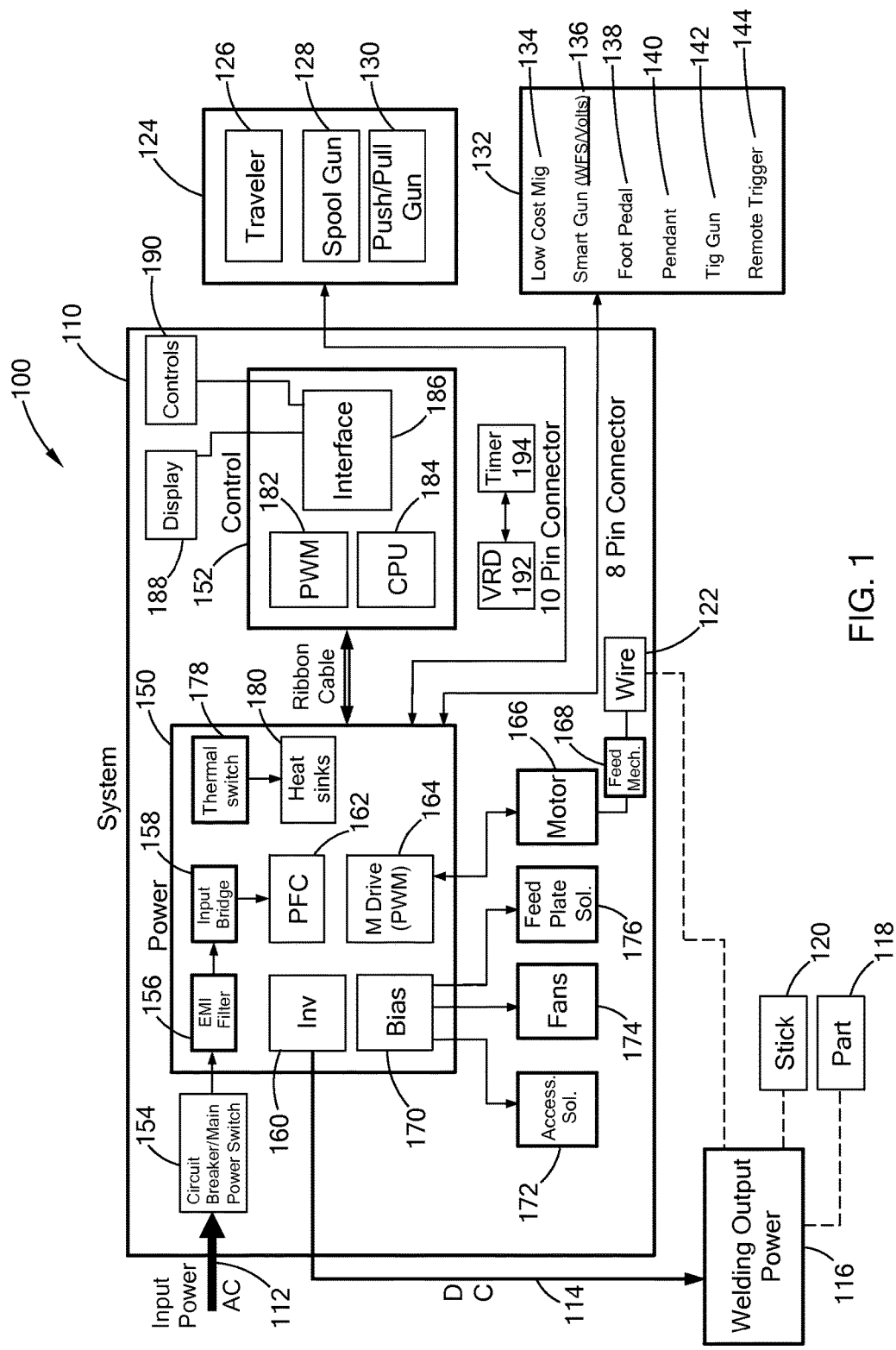
FIG. 1 is a schematic view of a welding system.

Now referring to FIG. 1, a power supply for a welding system 100 is provided. The power supply 110 receives input power 112 which may be an alternating current power line, for example a 220 volt AC power line. However, it is understood that the power supply 110 may be adaptable to receive a range of voltages, for example between 187 to 276 volts AC. In addition, it may also be possible to configure the power supply for other voltage ranges depending on the application and required welding output power. The power supply 110 provides a direct current power output voltage 114 that may be used as a welding output power 116. In some implementations, the power supply 110 may be used for stick welding (also known as Shielded Metal Arc Welding or SMAW) or various other welding applications such as MIG (Metal Inert Gas, also known as gas metal arc welding or GMAW), flux core arc welding, TIG (tungsten inert gas welding, also known as Gas Tungsten Arc Welding or GTAW), plasma arc, or other welding processes. Therefore, in one example the current return lead of the welding output power 116 may be provided to a part 118 that is to be welded, and the supply voltage may be provided to an electrode, for example a stick 120 or wire 122. Therefore, as the stick 120 comes in contact with the part 118 an arc may be formed that melts both the base metal and electrode and cooperates to form a weld. In other implementations, the output voltage may be provided through a wire 122 which may be continuously fed to the part to form a continuous weld. In TIG mode the electrode is not melted, and generally only the base metal is melted.

The power supply 110 may control the output voltage and the output current, as well as the feeding of the wire to optimize the welding process. In addition, the power supply 110 may be connected to one group of accessories 124 including for example a remote wire feeder 126, a spool gun 128, or a push/pull gun 130. Further, the power supply 110 may be connected to other groups of accessories 132, for example through an 8-pin connector. The second group of accessories 132 may include a MIG gun 134, a smart gun 136, a foot pedal 138, a pendant 140, a TIG gun 142, and/or a remote control/trigger 144.

Within the power supply 110, the input power 112 may be provided to a circuit breaker or switch 154. Power may be provided from the circuit breaker 154 to a power circuit 150. The power circuit 150 may condition the input power to provide a welding output power 116, as well as, for powering various additional accessories to support the welding process. The power circuit 150 may also be in communication with the control circuit 152. The control circuit 152 may allow the user to control various welding parameters, as well as, providing various control signals to the power circuit 150 to control various aspects of the welding process. The power from the circuit breaker 154 may be provided to an EMI filter 156 of the power circuit 150. Power is provided from the EMI filter 156 to an input bridge 158. Power may be provided from the input bridge 158 to a conditioning circuit 162. The conditioning circuit 162 may include a boost circuit, a transformer, as well as a power factor correction circuit.

Power is provided from the conditioning circuit 162 to the inverter 160 where the power is converted to a DC signal 114 thereby providing welding output power 116. Power may also be provided to a bias circuit 170 to power a number of accessories internal or external to the power supply 110 that facilitate operation of the power supply and welding process. For example, the bias circuit 170 may provide power to gas solenoid valves 172, fans 174, as well as, other accessory devices. In addition, power is provided to a motor drive circuit 164 that is in communication with a motor 166. The motor 166 may be in communication with a feed mechanism 168 configured to feed wire 122 to a weld gun for use in creation of the weld. The control circuit 152 may provide control signals to any of the previously mentioned circuits in the power circuit 150 to optimize the weld process and performance of the power supply 110. The control circuit 152 may include a pulse width modulator 182 and a processor 184 for analyzing various weld characteristics and calculating various weld parameters according to user settings, as well as, various feedback signals. In addition, an interface circuit 186 may be provided to control a display 188 that may provide information to the user of the welding system. The display 188 may include an LED display, a LCD display, or various other known display technology. The display may provide various menu choices to the user, as well as, providing various feedback on the welding process including the values of various parameters or graphs of previous welding characteristics. The controls 190 may also be in communication with the interface circuit 186 to allow the user to provide input such as various welding parameters to control the operation of the welding process.

The power supply 110 may further include a voltage reducing device (VRD) circuit 192, a low-power circuit that detects contact between the part 118 to be welded and the electrode. When an open circuit condition is detected between the electrode and the work piece, the VRD circuit 192 may reduce the maximum open circuit voltage to safe levels. When contact is made and/or the load is below a threshold resistance, the VRD circuit 192 may no longer reduce the voltage and thus may allow the welding system 100 to operate at full power. The VRD circuit 192 may be in communication with a timer 194. The timer 194 may be implemented as software as part of the control circuit 152, or may be comprised of an electronic circuit.

Figure 2A:
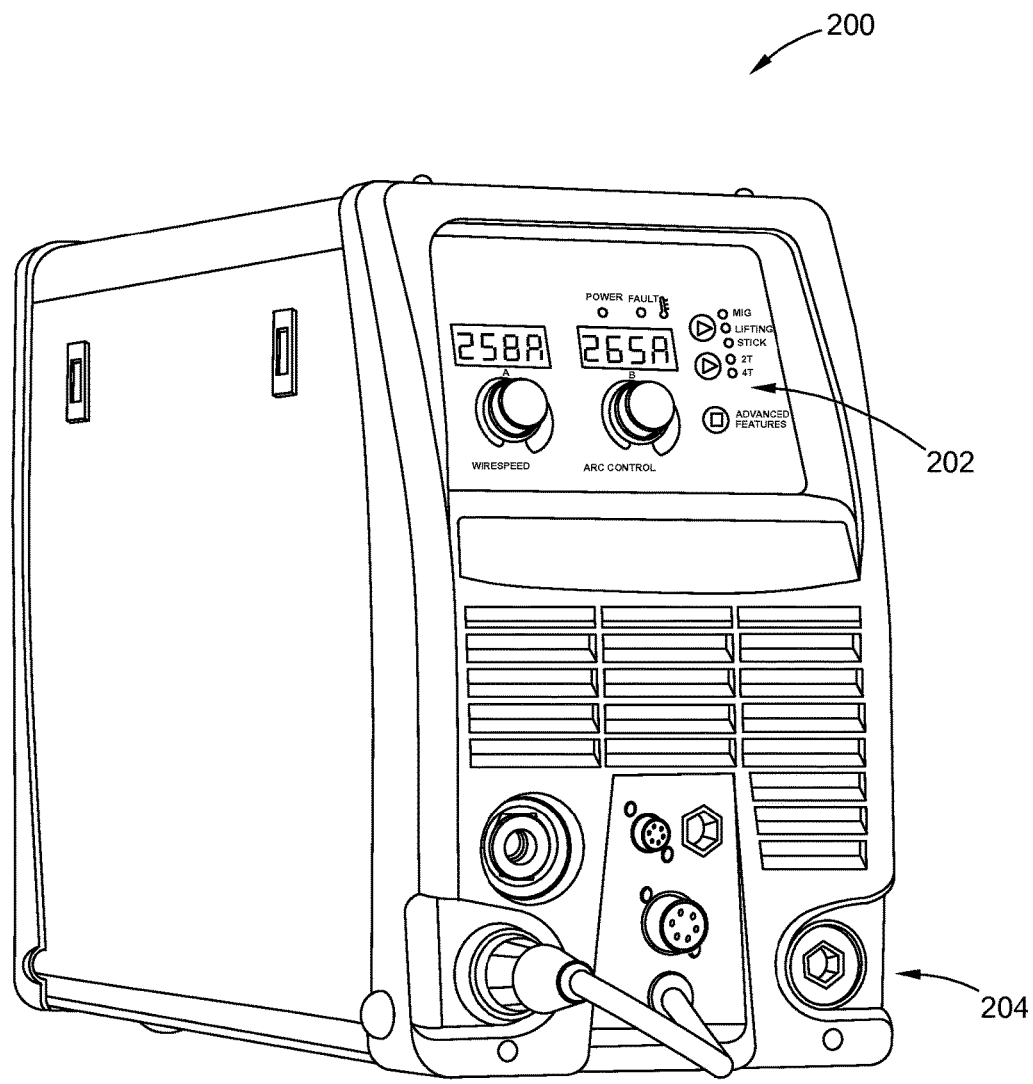
FIG. 2a is a perspective view of a housing which contains the welding system of FIG. 1.

Now referring to FIG. 2a, a housing 200 is provided that may be implemented with the welding system 100. The housing 200 may contain the power supply 110, and may further include a user interface 202 and a front connection panel 204. The front connection panel 204 may, for example, be used for connecting the power supply 110 to the first and second groups of accessories 124 and 132, as discussed above.

Figure 2B:
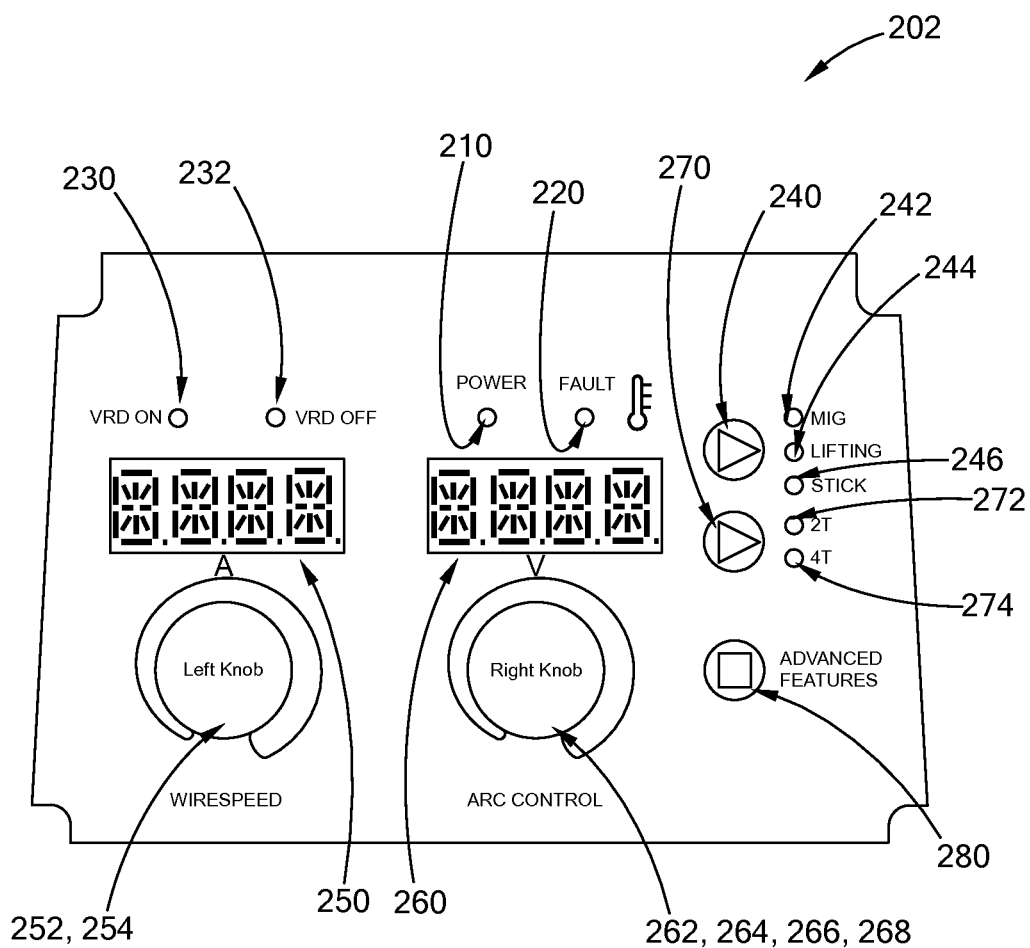

Now referring to FIG. 2b, a particular implementation of a user interface 202 is provided that may include various inputs selectable by a user and various indicators and displays. A power indicator 210 may indicate when the power supply 110 is receiving the input power 112. A fault light 220 may indicate when the welding process has entered a fault condition. A VRD "on" indicator 230 may indicate when the VRD is on, and a VRD "off" indicator 232 may indicate when the VRD is off.

A mode selection input 240 may allow the user to select a desired welding process. The mode selection input 240 may be a button which when pressed causes the power supply 100 to cycle through and select a welding process. Three welding process indicators 242, 244, 246 may respectively light upon selection of, for example, MIG, TIG, or stick welding. The MIG selection provides a suitable configuration for both gas metal arc welding and flux core arc welding.

A trigger interlock input 270 may allow a user to select between 2T and 4T modes for MIG, TIG and stick welds that are activated via an electric switch. The 2T mode allows the user to push and hold the switch to activate and release the switch to deactivate. The 4T mode allows the user to push and release the switch to activate, then push and release the switch again to deactivate. An indicator 272 may light when the 2T mode is selected, and an indicator 274 may light when the 4T mode is selected.

An amperage input 252 may allow a user to select a desired output current. A wire feed speed input 254 may allow a user to select a desired wire feed speed of the wire 122. The desired wire feed speed may be a desired steady-state wire feed speed. In some implementations, the inputs 252 and 254 may be combined into an adjustable knob. A user may press the adjustment knob to cycle between the inputs 252 and 254, and then turn the adjustment knob to select a desired value of the current or wire feed speed. The selected desired value may be displayed on a display 250, which may be a super bright red LED display.

A voltage input 262 may allow a user to select a desired output voltage of the welding signal. An inductance input 264 may allow a user to select a desired inductance which, for example, may optimize weld bead characteristics. An arc force input 266 may allow a user to select desired properties of arc force. A down slope input 268 may allow a user to select a down slope time, which is a function of the down ramp rate of the output current. In some implementations, the inputs 262, 264, 266, and 268 may be combined into an adjustable knob. A user may press the adjustment knob to cycle between the inputs 262, 264, 266, and 268, and then turn the adjustment knob to select a desired value of the voltage, inductance, arc force, or down slope. The selected desired value may be displayed on a display 260, which may be a super bright red LED display.

An advanced features input 280 may allow a user to select menus and toggle through various further inputs, which are displayed on the displays 250 and 260. A MIG welding main menu may provide inputs for operation control, pre-flow, spot on/off, spot time, stitch on/off, stitch time, dwell time, run-in percentage, post-flow, burn back time, wire sharp, and/or a setup submenu. The setup submenu may provide inputs for wire feed units, amperage calibration, voltage calibration, wire speed calibration, arc hour display, VRD (on, off or triggered), total weld energy (for heat input computation), and/or factory defaults. A stick welding main menu may provide inputs for operation control, hot start on/off, hot start time, hot start amperage, and/or a setup submenu. The setup submenu may provide inputs for arc hour display, VRD disable, and factory defaults. The TIG main menu may provide inputs for operation control, pre-flow, post-flow, and a setup submenu. The setup submenu may provide inputs for arc hour display, VRD disable, and factory defaults.

Burn back time may refer to an adjustable period of time that the power supply 110 may provide power for the welding process after the wire feed stops in order to burn back the wire and prevent it from sticking in the weld puddle. Wire sharp refers to the application of predefined current outputs applied to the wire, for example, a rapid series of powerful current pulses after the motor 166 is de-energized. This prevents a ball of molten metal from freezing on the end of the welding wire, and tapers the end of the weld wire to a sharp point, promoting a cleaner start when welding resumes. The current outputs terminate when an open-circuit is detected or after a predefined time or condition is reached. Run-in percentage refers to a percent of wire feed speed. The percentage may range, for example, from about 25 percent to about 150 percent of the wire feed speed. The run-in setting may, for example, allow a user to temporarily alter the selected wire feed speed to optimize MIG weld start characteristics.

The control circuit 152 may receive each of the quantities respectively associated with each of the inputs. Further, although the above inputs are shown in particular implementations, each of the inputs may be configured as a dial, adjustment knob, button, or switch, for example. Additionally, in some implementations, some of the inputs may be automatically selected by the control circuit 152. Which inputs are automatically selected and which inputs are user-selectable may depend on which welding process is selected. In some implementations, some parameters, for example wire diameter, material, gas, and joint design, may not be programmed into the control circuit 152.

Figure 3:
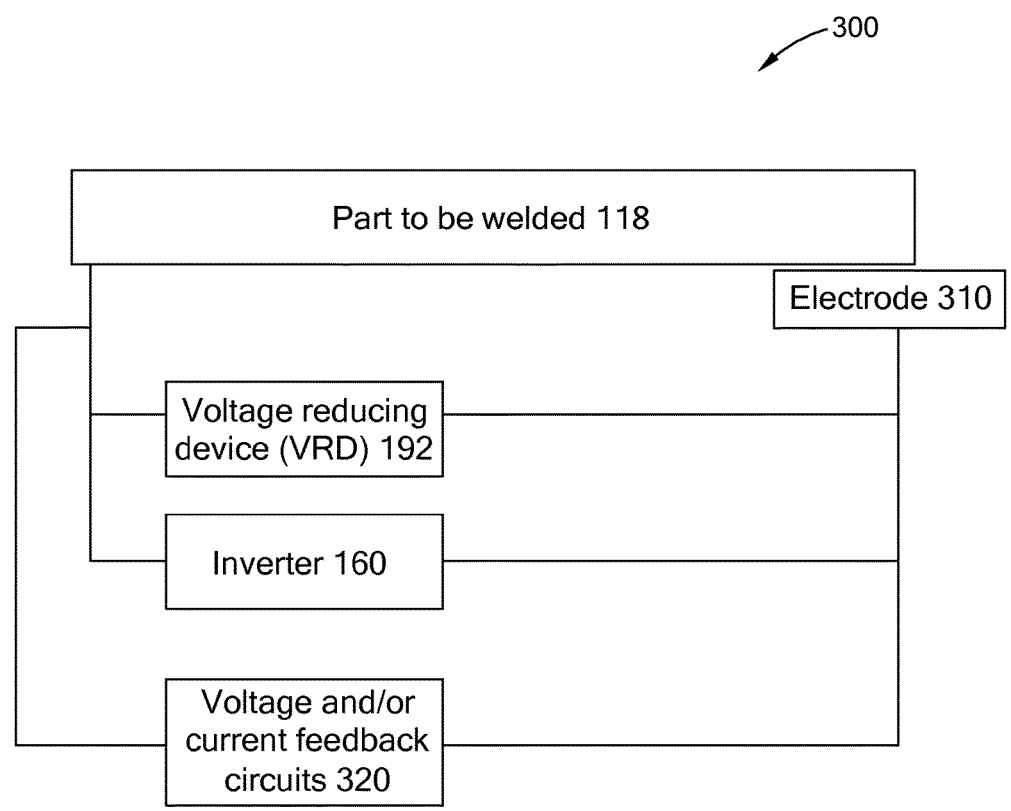
FIG. 3 is a schematic view of a circuit having a voltage reducing device.

Now referring to FIG. 3, one implementation of a circuit 300 having the voltage reducing circuit (VRD) 192 is provided. The inverter 160 may be connected with the part 118 to be welded and the electrode 118. The VRD circuit 192 may be placed parallel to the inverter 160. During operation, one of the VRD circuit 192 and the inverter 160 may provide a voltage that will complete the circuit between electrode 310 (e.g. the stick 120 or wire 122) and the part 118 to be welded. The VRD circuit 192 provides a low voltage relative to the full voltage provided by the inverter 160. For example, the low voltage provided for VRD circuit 192 would be under 35 volts, while the welding voltage would be well over 50 volts. Voltage and/or current feedback circuits 320 may detect a resultant voltage or current due to completion of the circuit with the VRD circuit 192 or the inverter 160. For any of the welding processes described herein, particularly those using non-consumable electrodes (e.g. stick 120), but also processes using a consumable electrode (e.g. 122), the voltage and/or current feedback circuits 320 can be used to detect whether or not a welding operation is in progress based on a detection of whether the part 118 to be welded is in contact with the electrode 310. Additionally or alternatively, for welding processes using a consumable electrode (e.g. wire 122), whether or not a welding operation is in progress can be detected based on whether a user presses a trigger on, for example, MIG gun 134, a smart gun 136, a foot pedal 138, a pendant 140, and/or a remote control/trigger 144. Therefore, in each instance where the method of FIG. 4, as described below, detects whether contact is made by detecting contact, it is understood that such detection can also be made by determining whether the trigger is pressed. Full operation of the circuit 300 will be understood with reference to method 400 and FIG. 4.

Figure 4:
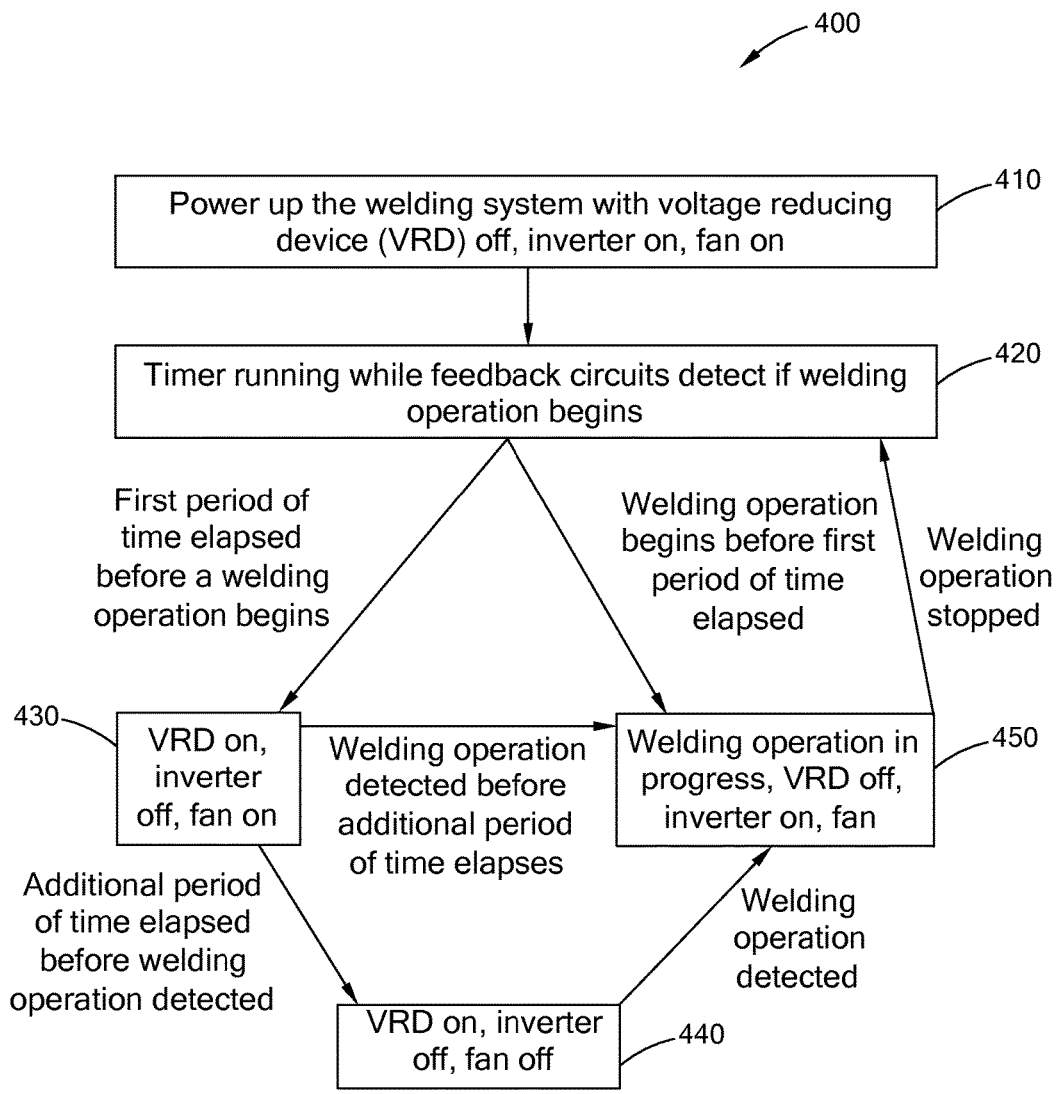
FIG. 4 is a flow chart illustrating a method of energy conservation and improved cooling in arc welding machines.

Now referring to FIG. 4, a method 400 is provided for energy conservation and improved cooling in arc welding machines. The method 400 was developed for shielded metal arc welding (SMAW), which is typically practiced without use of trigger mechanisms so requires continuous electrification of the consumable electrode, but the method may be utilized in a variety of welding processes, for example gas metal arc welding, flux core arc welding, or tungsten inert gas welding. The ordering of the steps presented herein is merely one implementation of the method 400. Those skilled in the art will recognize that the ordering may be varied, that some steps may occur simultaneously, that some steps may be omitted, and that further steps may be added. Moreover, each step involving the controller may be implemented by configuring (e.g. programming) the controller to perform the step.

The method starts in block 410. In block 410, the welding system 100 may be powered up, and the VRD circuit 192 may be initially turned off, the inverter 160 may be turned on, and one or more fans 174 may be turned on.

In block 420, when the voltage and/or current feedback circuits 320 determine that a welding operation is stopped or not running, the timer 194 in communication with the VRD circuit begins running 194. The method 400 detects whether a welding operation has begun, for example by using the voltage and/or current feedback circuits 320 detects whether the part 118 to be welded is in contact with the electrode 310 or detecting if the trigger is pulled. The timer 194 may determine whether a first predefined period of time has elapsed before the system detects welding, for example by detecting contact between the part 118 and the electrode 310 or the trigger is pulled. The first predefined period of time may be about 5, about 10, about 15, or about 20 minutes from the end of the welding process, but in various implementations may take on a value from between about 5 minutes to about 10 minutes, or between about 5 to about 15 minutes, or between about 5 to about 20 minutes, or between about 10 to about 15 minutes, or between about 10 to about 20 minutes, or between about 15 to about 20 minutes, for example. In some implementations, the method 400 may use a first period of time that is not predetermined. Rather, the first period of time may depend on welding conditions or feedback during the welding process. Additionally or alternatively, the first period of time or the first predefined period of time may depend on various pre-selected welding parameters.

If the first predefined period elapses without the voltage and/or current feedback circuits 320 detecting contact between the part 118 and the electrode 310 or the trigger being pulled, thus indicating that the welding process has been idle for the first predefined period of time, then the method 400 may proceed to block 430. If the voltage and/or current feedback circuits 320 detect a welding operation before the first predefined period of time elapses, then the method 400 may proceed to block 450. Throughout the first predefined period of time, that is, after the first predefined period of time begins and before the first predefined period of time elapses, the inverter 160 continues to provide welding output voltage.

In block 430, the VRD circuit 192 may be turned on and the inverter 160 may be turned off, thus reducing the maximum open circuit voltage to safe levels as long as no welding operation is detected. Additionally, the one or more fans 174 may be left on to cool the power supply 110. Now, the VRD circuit 192 provides a low voltage to allow the voltage and/or current feedback circuits 320 to detect the start of a welding operation by detecting whether the part 118 to be welded is in contact with the electrode 310.

The timer 194 may continue running, and the system detects if a second predefined period of time elapses before the voltage and/or feedback circuits 320 detect a welding operation, or if the voltage and/or feedback circuits 320 detect a welding operation before the second predefined period of time elapses. The second predefined period of time may begin counting at the start of block 430, that is, when the first predefined period of time elapses. Although, in some implementations, the time periods could have the same starting time or offset starting times such that the periods could be overlapping or discontinous. The second predefined period of time may be about 5, about 10, about 15, or about 20 minutes from the end of the first predefined time period, but in various implementations may take on a value from between about 5 minutes to about 10 minutes, or between about 5 to about 15 minutes, or between about 5 to about 20 minutes, or between about 10 to about 15 minutes, or between about 10 to about 20 minutes, or between about 15 to about 20 minutes, for example. In some implementations, the method 400 may use a second period of time that is not predetermined. Rather, the second period of time may depend on welding conditions or feedback during the welding process. For example, one or more thermistors or other thermal sensors may be coupled to one or more of a transformer, inductor, transistor, diode, or other component prone to heating, and the second period of time may based on the feedback of the one or more thermal sensors. In other examples, the feedback could directly be used to determine when the fan will be deactivated. That is, the fan may be shut down based on the feedback, for example when the feedback crosses a threshold (e.g. a measured temperature falls below a temperature threshold). Additionally or alternatively, the second period of time or the second predefined period of time may depend on various pre-selected welding parameters.

If the second predefined period of time elapses before contact between the part 118 and the electrode 310 is detected or the trigger is pulled, then the method 400 proceeds to block 440. If contact between the part 118 and the electrode 310 is detected, meaning that a welding operation is detected, before the second predefined period of time elapses, then the method 400 proceeds to block 450.

In block 440, the VRD circuit 192 may remain on and the inverter 160 may remain off. However, the one or more fans 174 may be turned off. Once the voltage and/or current feedback circuits 320 detect contact between the part 118 and the electrode 310 is detected or the trigger is pulled, meaning that a welding operation is detected, then the method proceeds to block 450.

In block 450, the part 118 and the electrode 810 may be in contact or the trigger may be pulled and the user may be starting to weld. As such, the VRD circuit 192 may be turned off and the inverter 160 may be turned on, thus allowing the welding system 100 to operate at full welding voltage. Additionally, the fan may be turned on. However, if it is detected that welding has stopped, for example by determining that the part 118 and electrode 310 are no longer in contact, the method 400 may return to block 420 and the timer 194 may be reset and begin counting the first predefined period of time.

Combination of the VRD circuit 192 with the timer 194 provides improved cooling and energy benefits relative to a system with no VRD circuit 192. At the same time, the combination of the VRD circuit 192 and the timer 194 ensures superior starting characteristics not found in a system with a VRD circuit 192 but no timer 194.

Figure 5:
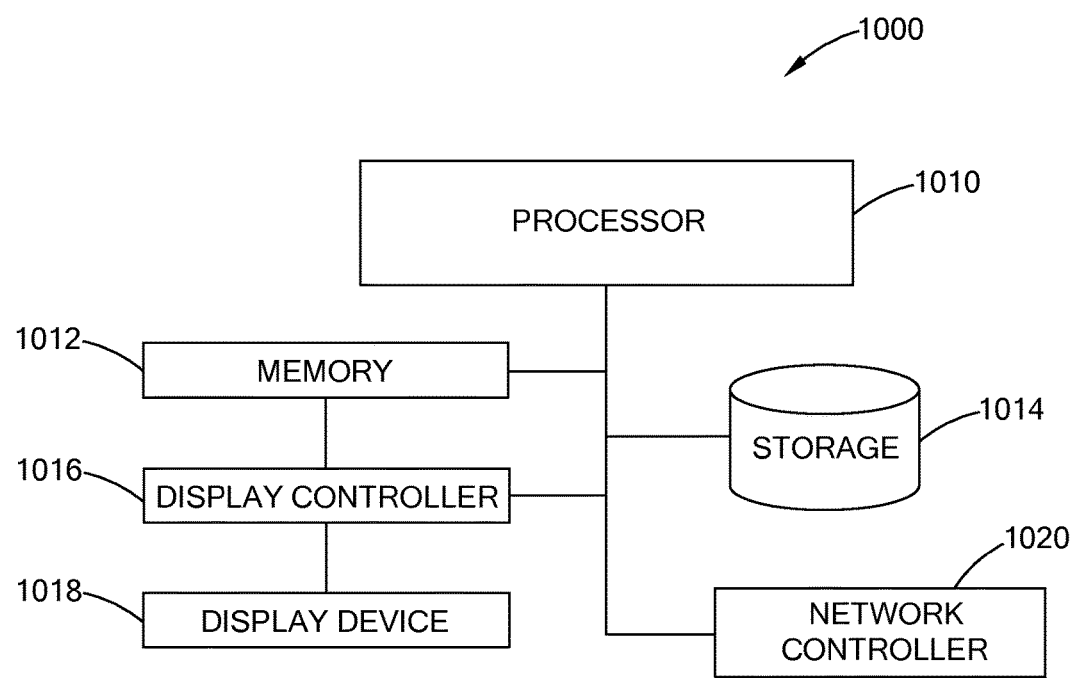
FIG. 5 is a schematic view of a processing system for implementing the methods described herein.

Any of the controllers, control circuits, modules, servers, or engines described may be implemented in one or more computer systems or integrated controllers. One exemplary system is provided in FIG. 5. The computer system 1000 includes a processor 1010 for executing instructions such as those described in the methods discussed above. The instructions may be stored in a computer readable medium such as memory 1012 or storage devices 1014, for example a disk drive, CD, or DVD, or in some form of nonvolatile memory, internal or external to the processor, such as EPROM or flash. The computer may include a display controller 1016 responsive to instructions to generate a textual or graphical display on a display device 1018, for example a computer monitor. In addition, the processor 1010 may communicate with a network controller 1020 to communicate data or instructions to other systems, for example other general computer systems. The network controller 1020 may communicate over Ethernet or other known protocols to distribute processing or provide remote access to information over a variety of network topologies, including local area networks, wide area networks, the Internet, or other commonly used network topologies.

In other embodiments, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system or processor. Further, in an exemplary, non-limited embodiment, implementations can include distributed processing, component/object distributed processing, and parallel processing. Alternatively, virtual computer system processing can be constructed to implement one or more of the methods or functionality as described herein.

Further, the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of this invention. This description is not intended to limit the scope or application of this invention in that the invention is susceptible to modification, variation and change, without departing from spirit of this invention, as defined in the following claims.

We claim:

1. A system for generating a weld, the system comprising:
a power circuit having an inverter for generating welding output voltage for a welding process;
a control circuit in communication with the power circuit;
a voltage reducing circuit in parallel with the inverter and in communication with the control circuit for generating a reduced output voltage relative to the welding output voltage if the welding process is idle for a first period of time; and a timer for determining the first predefined period of time and for determining a second period of time after the first period of time during which the welding process remains idle, wherein the voltage reducing circuit and the inverter supply power to a welding electrode and a part to be welded such that either the voltage reducing circuit or the inverter provides a voltage that completes a circuit with the welding electrode and the part to be welded, wherein the inverter is turned on and the voltage reducing circuit is turned off prior to the first period of time elapsing to provide the welding output voltage, wherein the inverter is turned off and the voltage reducing circuit is turned on to provide the reduced output voltage after the first period of time elapses, and wherein the inverter remains turned off, the voltage reducing circuit remains turned on, and an accessory component is turned off after the second period of time elapses.

2. The system of claim 1 wherein the first period of time is a predefined period of time.

3. The system of claim 2 wherein the predefined period of time is between about 5 and about 15 minutes.

4. The system of claim 2 wherein the predefined period of time is a user selectable period of time.

5. The system of claim 2 wherein the power circuit generates welding output voltage while the welding process is idle for the first predefined period of time.

6. The system of claim 1 further comprising a voltage feedback circuit for determining whether the welding process is idle for the first period of time.

7. The system of claim 1 further comprising a current feedback circuit for determining whether the welding process is idle for the first period of time.

8. The system of claim 1 further comprising a feedback circuit, wherein the welding output voltage is restored from the reduced voltage if the feedback circuit detects contact between an electrode and a part to be welded.

9. The system of claim 1, wherein the fan shuts down between about 5 minutes and about 10 minutes after the voltage reducing circuit begins generating reduced output voltage.

10. The system of claim 1, wherein the fan shuts down based on feedback of one or more thermal sensors.

11. A method for generating a weld, comprising:
generating, by a power circuit, a welding output voltage for a welding process;
generating, by a voltage reducing circuit, a reduced output voltage relative to the welding output voltage if the welding process is idle for a first period of time; and
determining a second period of time after the first period during which the welding process remains idle, wherein the voltage reducing circuit is in parallel with an inverter and at least one of a voltage feedback circuit and a current feedback circuit for switching between the reduced output voltage provided by the voltage reducing circuit and the welding output voltage provided by the inverter, wherein the voltage reducing circuit and the inverter are connected to a welding electrode and a part to be welded such that either the voltage reducing circuit or the inverter provides a voltage that completes a circuit with the welding electrode and the part to be welded, wherein the inverter is turned on and the voltage reducing circuit is turned off prior to the first period of time elapsing to provide the welding output voltage, wherein the inverter is turned off and the voltage reducing circuit is turned on to provide the reduced output voltage after the first period of time elapses, and wherein the inverter remains turned off, the voltage reducing circuit remains turned on, and an accessory component is turned off after the second period of time elapses.

12. The method of claim 11 wherein the first period of time is a predefined period of time.

13. The method of claim 12 wherein the predefined period of time is a user selectable period of time.

14. The method of claim 11 further comprising generating the welding output voltage while the welding process is idle for the first period of time.

15. The method of claim 11 further comprising restoring the welding output voltage from the reduced voltage if the contact is detected between an electrode and a part to be welded.

16. The method of claim 11 further comprising shutting down the fan between about 5 minutes and about 10 minutes after beginning to generate the reduced output voltage.

17. The method of claim 11 further comprising shutting down the fan based on feedback from one or more thermal sensors.

18. The system of claim 1, wherein the second period of time is based on welding conditions.

19. The system of claim 18, wherein the second period of time is determined by feedback from a thermal sensor.

20. The system of claim 1, wherein the inverter is turned on and the voltage reducing circuit is turned off after the first period of time elapses when contact between the welding electrode and the part to be welded is detected.

* * * * *